(12) United States Patent
Tuchman et al.

(10) Patent No.: US 8,559,102 B2
(45) Date of Patent: Oct. 15, 2013

(54) INFRARED SIGNAL BLINDER SYSTEM AND METHOD

(76) Inventors: Nelson M. Tuchman, Scarsdale, NY (US); Daniel S. Tuchman, Scarsdale, NY (US)

( * ) Notice: Subject to any disclaimer, the term of this patent is extended or adjusted under 35 U.S.C. 154(b) by 217 days.

(21) Appl. No.: 13/182,171

(22) Filed: Jul. 13, 2011

(65) Prior Publication Data

US 2012/0012764 A1   Jan. 19, 2012

Related U.S. Application Data

(60) Provisional application No. 61/364,657, filed on Jul. 15, 2010.

(51) Int. Cl.
*G02B 5/20* (2006.01)
*F21V 9/06* (2006.01)

(52) U.S. Cl.
USPC .............. 359/361; 348/14.05; 250/515.1

(58) Field of Classification Search
None
See application file for complete search history.

(56) References Cited

U.S. PATENT DOCUMENTS

| | | |
|---|---|---|
| 5,357,101 A | 10/1994 | Plesko |
| 5,637,964 A | 6/1997 | Hakkarainen et al. |
| 5,825,413 A | 10/1998 | Mullis |
| 5,877,500 A | 3/1999 | Braig et al. |
| 5,894,278 A | 4/1999 | Kubo et al. |
| 6,271,831 B1 | 8/2001 | Escobosa et al. |
| 6,384,407 B1 | 5/2002 | Frank |
| 6,823,105 B2 | 11/2004 | Zloter et al. |
| 6,948,823 B2 | 9/2005 | Pohlert et al. |
| 7,283,084 B2 | 10/2007 | Di Peppe |
| 7,390,101 B2 * | 6/2008 | Lundgren .............. 359/858 |
| 7,460,777 B1 * | 12/2008 | Hines .............. 396/71 |
| 2001/0019454 A1 | 9/2001 | Tadic-Galeb et al. |
| 2007/0081346 A1 | 4/2007 | Spinello |

FOREIGN PATENT DOCUMENTS

| | | |
|---|---|---|
| JP | 60-030651 U | 3/1985 |
| JP | 9-331075 | 12/1997 |
| JP | 10-124208 | 5/1998 |
| KR | 20-1988-0023059 U | 12/1988 |
| KR | 20-1995-0012791 U | 5/1995 |
| KR | 10-1999-0032132 A | 5/1999 |

OTHER PUBLICATIONS

Gervais et al. Proc. of SPIE. vol. 7298 (Apr. 2009) (Infrared-based Object Tracking. Proc. of SPIE. vol. 7298. Apr. 2009).*
International Search Report and Written Opinion dated Mar. 2, 2012 in corresponding International Application No. PCT/US2011/044162.

* cited by examiner

*Primary Examiner* — Stephone Allen
*Assistant Examiner* — Jyotsna Dabbi
(74) *Attorney, Agent, or Firm* — Ostrolenk Faber LLP

(57) ABSTRACT

An infrared signal blinder that blocks infrared light signals from reaching an infrared receiver that is configured with an electronic device. The blinder includes a hollow body portion having an inner surface and an outer surface, and further having a first open end and second open end. The first open end is larger than the second open end. Further, a base portion is provided at the first open end or the second open end. The base portion includes a bore that is at least partially aligned with the first open end or the second open end. The infrared signal blinder is coupleable to an electronic device configured with an infrared receiver. The infrared signal blinder is configured to shield at least one communication signal from reaching the infrared receiver.

13 Claims, 3 Drawing Sheets

INFRARED SIGNAL BLINDER SYSTEM AND METHOD

RELATED APPLICATION

This application is based on and claims priority to U.S. Provisional Patent Application Ser. No. 61/364,657, filed on Jul. 15, 2010 and entitled SYSTEM AND METHOD FOR TARGETING INFRARED SIGNALS, the entire contents of which are hereby incorporated by reference.

BACKGROUND

1. Field

The present application relates generally to communication and, more particularly, to blocking communication signals from reaching a device.

2. Related Art

Infrared light signals are useful for providing encoded information to control entertainment devices (e.g., televisions, audio receivers, compact disc players, DVD players, BLU-RAY players or the like) as well as appliances and/or other devices, such as lighting control devices, air conditioners and heating units. Infrared remote control units are widely used to transmit the signals due to their convenience and relatively low manufacturing cost, as well as due to the large number of devices that can be controlled thereby.

Infrared light signals travel in a wide dispersion. As a result, it is difficult to direct the signals to just one of a plurality of devices that are located in close proximity. In a residential environment, such as a single family home, this may not pose a problem because devices in close proximity typically do not respond to the same set of infrared control codes. Different makes and models of devices, such as televisions, that are controllable via infrared signals are usually configured to interpret and respond to respective instructions that are encoded in infrared signals. Accordingly, one particular make and model of television responds to one instruction set, while a different make and model responds to a different instruction set. Two televisions made by different manufacturers and placed in close proximity of each other will not simultaneously respond to infrared signals transmitted by a single remote control unit, because the televisions are not configured to interpret the same remote control codes. In such case, the wide dispersion of infrared signals is largely irrelevant.

Two or more of the same make and model televisions that are located in close proximity, however, will simultaneously respond to a single remote control unit. For example, two of the same SONY televisions turn on and off together in response to infrared signals transmitted by a single remote control unit.

It is recognized by the inventor that various facilities may purchase a number of the same make and/or model devices, such as televisions, for convenience and/or reduced price. Example locations where a plurality of the same make and model televisions may be located in near proximity of each other include, but are not limited to, extended care facilities, hospitals, nursing homes and various patient care facilities. In such environments, the characteristic of a plurality of televisions responding simultaneously to infrared signals transmitted by a single remote control unit is undesirable. Television viewers, for example, want exclusive control of their televisions.

SUMMARY

In an embodiment, an infrared signal blinder is provided, that comprises a hollow body portion having an inner surface and an outer surface, and further having a first open end and a second open end, wherein the first open end is larger than the second open end. The infrared signal blinder further includes a base portion provided at the second open end or the first open end, that has a bore that is at least partially aligned with the first open end or the second open end. The infrared signal blinder is coupleable to an electronic device configured with an infrared receiver. Further, the infrared signal blinder is shaped and configured to shield at least one communication signal from reaching the infrared receiver.

Other features and advantages of the present application will become apparent from the following description of the invention that refers to the accompanying drawings.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown. The features and advantages of the present invention will become apparent from the following description of the invention that refers to the accompanying drawings, in which.

DESCRIPTION

The present application addresses shortcomings, such as described above, associated with controlling one of a plurality of devices using a single infrared remote control unit. In a preferred embodiment, a signal blinder is provided with an electronic device that is configured with an infrared signal receiver, such as a television, and the signal blinder operates to block stray infrared signals from reaching the infrared receiver. Using the signal blinder of the present application, infrared signals that are transmitted by a single remote control unit or other infrared signal emitting device and that are intended for one respective device (e.g., a particular television) are blocked from reaching an unintended device.

The signal blinder in accordance with the teachings herein is particularly useful in environments where a plurality of the same make and model devices (e.g., the same televisions) are located in close proximity of each other and users intend to remotely control respective ones of the devices. The infrared signal blinder blocks unwanted infrared signals, thereby shielding the device from changing from one state to another. For example, two people sharing a room in a nursing home are each provided with the same make and model television, and each uses a remote control unit that transmits the same infrared signal code set as the other for the televisions. Using the infrared signal blinder in accordance with the teachings herein, each roommate respectively controls just his or her television, without inadvertently affecting the other roommate's television.

In addition to blocking unwanted infrared signals, the infrared signal blinder of the present application is shaped and configured to enable infrared signals transmitted from a respective remote control unit or other infrared signal emitting device to be received by the intended device's infrared receiver. Thus, the teachings herein enable a blocking of infrared signals from one or more respective other infrared signal emitting devices, while enabling reception of infrared signals transmitted from one other infrared signal transmitter. In this way, an infrared receiver (e.g., provided with a television) detects signals from an appropriate infrared signal emitting device (e.g., a particular remote control unit).

Figure 1:
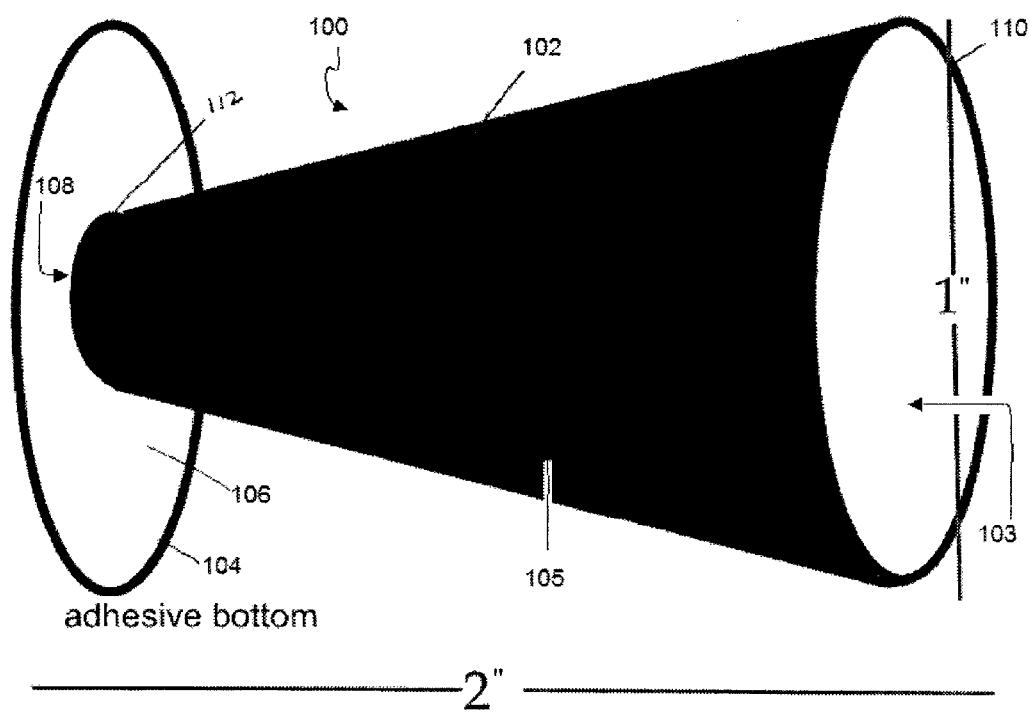
FIG. 1 illustrates an example infrared blinder 100 in accordance with a example embodiment.

Referring now to the drawings, in which like reference numerals refer to like elements, FIG. 1 illustrates an example infrared signal blinder 100 in accordance with a preferred embodiment. In the example shown in FIG. 1, infrared signal blinder 100 includes a parabolic body portion 102. Body portion 102 is preferably at least partially hollow, and comprises inner surface 103 and outer surface 105. In one or more embodiments, inner surface 103 is coated with reflective material or is otherwise configured to be reflective, thereby enabling infrared signals to travel there-through and to reach an infrared receiver provided with a television or other electronic device. Outer surface 105 is preferably configured with a non-reflective material or is otherwise configured to prevent or reduce the ability for infrared signals to reflect from the outer surface and interfere with other electronic devices configured with infrared signal receivers. For example, outer surface 105 may be coated with an absorbing agent that at least partially absorbs infrared signals.

Continuing with reference to the example infrared signal blinder 100 shown in FIG. 1, body portion 102 is coupled to base portion 104. In the example shown in FIG. 1, base portion 104 is substantially round and attaches or otherwise couples to a device provided with an infrared signal receiver, such as a television set or other infrared signal controllable device. Base portion 104 may be configured in other shapes, and may be substantially square, rectangular, triangular or other suitable shape. Base portion 104 further comprises bore 108 through which infrared signals travel to reach an infrared signal receiver. Surface area 106 of base portion 104 is preferably non-transparent to preclude or prevent infrared signals from traveling there-through or through bore 108. Thus, infrared signals are preferably unable to penetrate base portion 104 and reach an infrared receiver configured with an electronic device.

Also in an embodiment, infrared signal blinder 100 is preferably formatted in a dark color, such as black, dark grey, blue or brown, to disrupt unwanted infrared signals from receiving an infrared receiver.

In an embodiment, base portion 104 may be at least partially fashioned with an adhesive for coupling infrared signal blinder 100 to a device configured with an infrared signal receiver. For example, base portion 104 may be provided with glue or a glue-like material for adhering to an electronic device. Alternatively, base portion 104 may couple infrared signal blinder 100 to a device in other ways, such as via VELCRO, two-sided tape, or magnetic or other mechanical coupling. In these embodiments, infrared signal blinder 100 is removably coupled to the device.

In yet another alternative embodiment, infrared signal blinder 100 is configured to be integrated with a device having an infrared signal receiver, such as a television. In this alternative embodiment, infrared signal blinder 100 is not removably coupled to the television or other device, but is integrated therewith.

Continuing with reference to the example infrared signal blinder 100 shown in FIG. 1, two ends (110 and 112) of body portion 102 are provided. One end 110 may be configured with a larger diameter than the other end 112, thereby providing a funnel-shaped body 102. In the example infrared signal blinder 100 shown in FIG. 1, base portion 104 is located at end 112. Other embodiments are supported by the teachings herein, however, including to configure infrared signal blinder 100 with base portion 104 located at end 110.

In the example infrared signal blinder 100 shown in FIG. 1, the diameter of end 110 is approximately one inch (1"), and the length of infrared signal blinder 100 is preferably approximately two inches (2"). Of course, one skilled in the art will recognize that other size and shape dimensions are supported by the teachings herein and that the size and shape of infrared signal blinder 100 is not limited to the precise instrumentalities shown, for example, in FIG. 1. For example, one end 110 may be wider or taller than the other end 112 for directing infrared signals to an infrared receiver.

Thus, as shown in the example embodiment of FIG. 1, infrared signals are precluded from being received by an infrared receiver, such as on a television or other multimedia device, unless such signals travel through body portion 102 and bore 108, which signals would be limited to those signals directly in front of the blinder.

Figure 2:
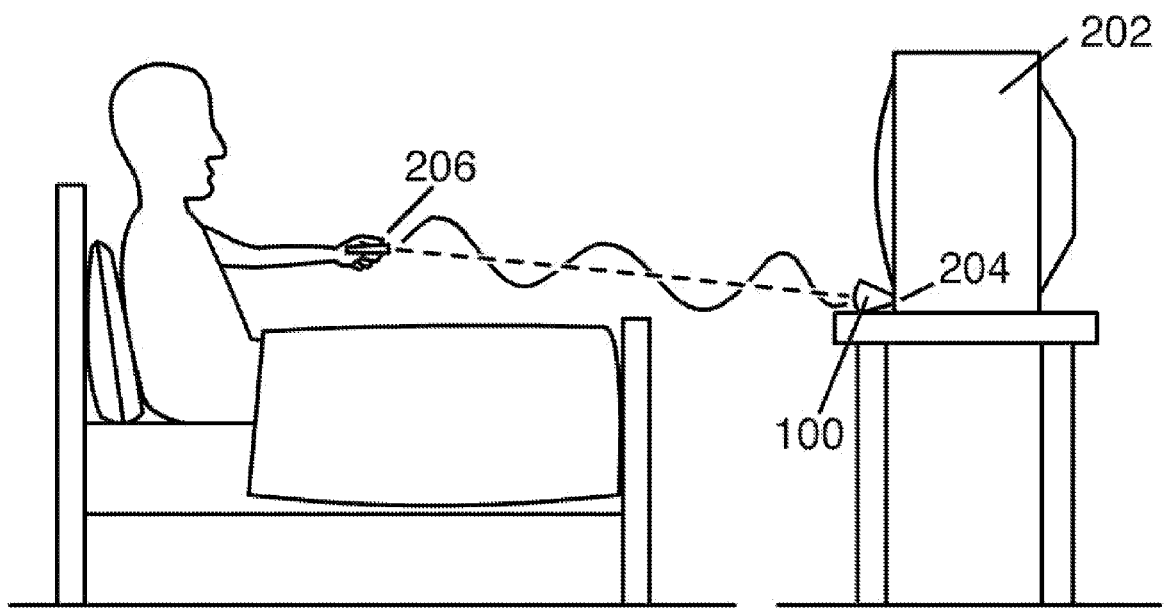
FIG. 2 illustrates an example embodiment of a user controlling a television set with a remote control unit using an infrared signal blinder in accordance with the teachings herein.

FIG. 2 illustrates an example embodiment of an alternative embodiment of a television 202 that is fashioned with infrared signal blinder 100, and further illustrates a user controlling the television with a remote control unit 206 that emits one or more infrared signals. As shown in FIG. 2, television 202 further includes infrared receiver 204 to which infrared signal blinder 100 is coupled. In the example configuration shown in FIG. 2, television 202 is integrated with infrared signal blinder 100, and infrared signal blinder 100 is not removably coupled thereto.

Figure 3:
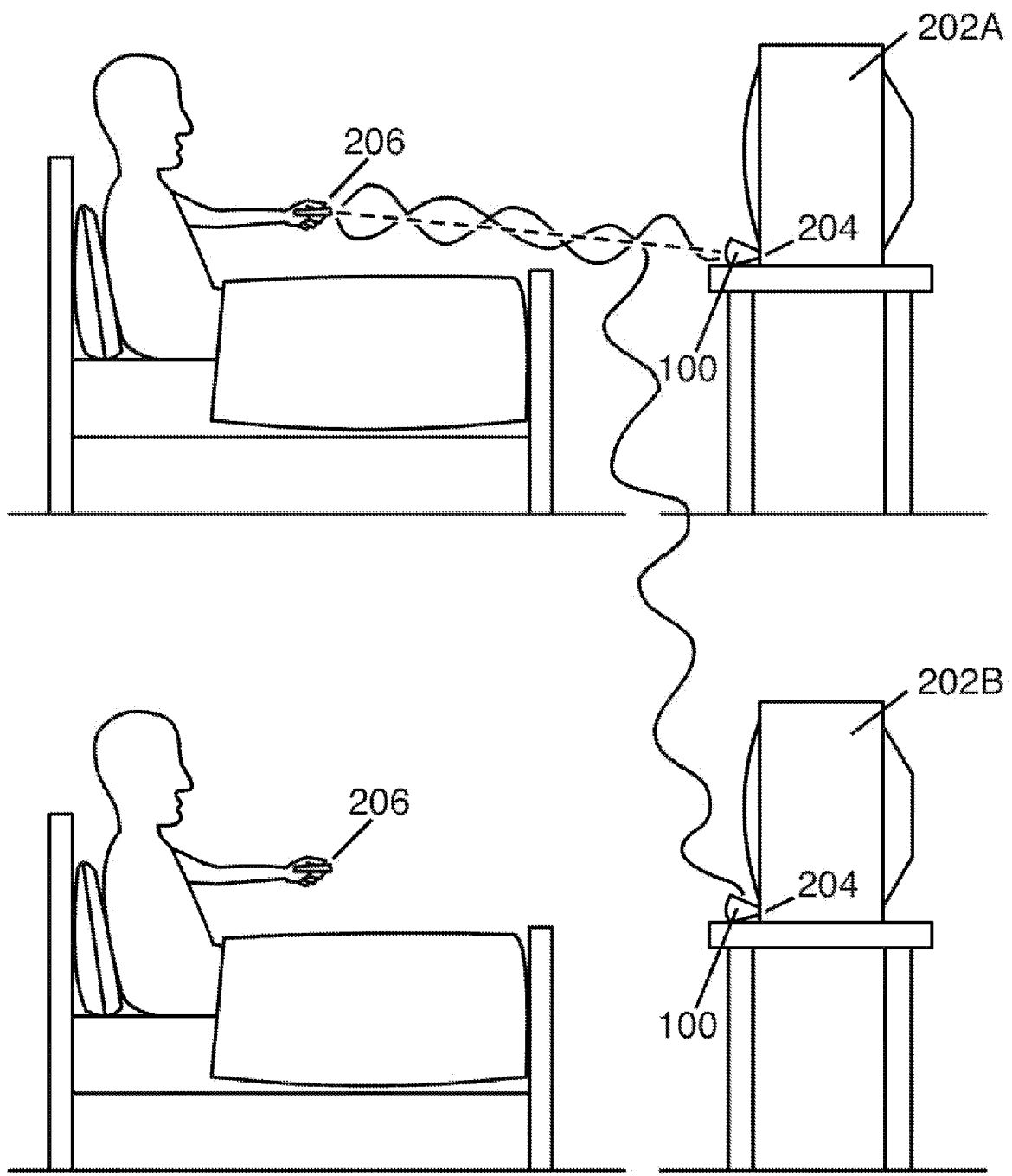
FIG. 3, illustrates an example room wherein two television sets, each provided with infrared signal blinder, function in accordance with the teachings herein.

FIG. 3 illustrates an example room environment that includes a plurality of televisions 202. Each of the televisions 202 shown in FIG. 3 includes a respective infrared signal blinder 100, and operates to receive infrared signals only from a particular infrared emitting device (e.g., remote control unit) that is positioned substantially in front of a respective television 202. Any infrared emitting device that is not so positioned will not function to control a respective television 202 because the infrared signal blinder 100 will block any infrared signals from reaching the infrared receiver 204. Accordingly, and as shown in FIG. 3, one television, television 202A, is controlled by one user via that user's respective remote control unit 206, while the other television, television 202B, is not. In this way, a first user enjoys watching and controlling his television 202A, while the other user's television 202B is not controlled and the user is undisturbed, for example while reading or sleeping.

Although the present invention has been described in relation to particular embodiments thereof, many other variations and modifications and other uses will become apparent to those skilled in the art. For example, although infrared signal blinder 100 is illustrated in a rounded fashion, other shapes are envisioned herein. For example infrared signal blinder 100 may be substantially rectangular or square-shaped. Alternatively, infrared signal blinder 100 may be triangular in shape, or may be pyramidal. Moreover, the dimensions of the respective elements of infrared signal blinder 100, including end 110, end 112 and body 102 may vary without departing from the teachings herein.

It is preferred, therefore, that the present invention be limited not by the specific disclosure herein.

What is claimed is:
1. An infrared signal blinder, comprising:
   a hollow body portion having an inner surface and an outer surface, and further having a first open end and a second open end, wherein the first open end is larger than the second open end;

a base portion provided at the second open end or the first open end, the base portion having a bore that is at least partially aligned with the first open end or the second open end, wherein the infrared signal blinder is coupleable to an electronic device configured with an infrared receiver, and further wherein the infrared signal blinder is shaped and configured to shield at least one communication signal from reaching the infrared receiver.

2. The infrared signal blinder of claim 1, wherein the infrared signal blinder is removably coupled to the electronic device.

3. The infrared signal blinder of claim 1, wherein the infrared signal blinder couples to the electronic device at the base portion.

4. The infrared signal blinder of claim 1, wherein the inner surface is reflective.

5. The infrared signal blinder of claim 1, wherein the outer surface is non-reflective.

6. The infrared signal blinder of claim 1, wherein the base portion is non-transparent.

7. The infrared signal blinder of claim 1, wherein the body portion is substantially conical.

8. The infrared signal blinder of claim 1, wherein the body portion is substantially pyramidal.

9. The infrared signal blinder of claim 1, wherein the body portion is substantially parabolic.

10. The infrared signal blinder of claim 1, wherein the base portion is substantially round.

11. The infrared signal blinder of claim 1, wherein the base portion is substantially square.

12. The infrared signal blinder of claim 1, wherein the base portion is at least partially configured with an adhesive.

13. A system for infrared signal interference, the system comprising:

a signal blinder configured with:

a hollow body portion comprising an inner portion and an outer portion, and further having a first open end and a second open end, wherein the first open end is larger than the second open end;

a base portion provided at the first open end or the second open end, the base portion having a bore at least partially aligned with the second open end; and a device configured with an infrared receiver, wherein the infrared signal blinder is removably coupled to an electronic device configured with an infrared receiver, and further wherein the infrared signal blinder is configured to shield at least one communication signal from reaching the infrared receiver.

* * * * *